United States Patent [19]
Nishiwaki et al.

[11] Patent Number: 4,991,919
[45] Date of Patent: Feb. 12, 1991

[54] OPTICAL HEAD APPARATUS INCLUDING CONCENTRIC, PERIODIC GRATING IN A WAVEGUIDE

[75] Inventors: Seiji Nishiwaki, Katano; Yoshinao Taketomi, Moriguchi; Shinji Uchida, Osaka; Takaaki Tomita, Moriguchi; Taketoshi Yonezawa; Sadao Mizuno, both of Ibaraki, all of Japan

[73] Assignee: Matsushita Electric Industrial Co., Ltd., Osaka, Japan

[21] Appl. No.: 415,224

[22] PCT Filed: Dec. 28, 1988

[86] PCT No.: PCT/JP88/01344

§ 371 Date: Oct. 18, 1989

§ 102(e) Date: Oct. 18, 1989

[87] PCT Pub. No.: WO89/06424

PCT Pub. Date: Jul. 13, 1989

[30] Foreign Application Priority Data

Dec. 29, 1987 [JP] Japan ................... 62-336213
Aug. 5, 1988 [JP] Japan ................... 63-196583
Oct. 3, 1988 [JP] Japan ................... 63-249198

[51] Int. Cl.⁵ .................. G02B 6/34; G02B 27/42; G11B 7/00
[52] U.S. Cl. .................. 350/96.19; 350/96.11; 350/96.12; 350/162.2; 350/162.21; 350/162.23; 250/201.5; 369/44.12; 369/44.14
[58] Field of Search .............. 350/96.11, 96.12, 96.15, 350/96.19, 162.2, 162.21, 162.23; 250/201.5; 369/44.12, 44.14, 44.17, 109, 110

[56] References Cited

U.S. PATENT DOCUMENTS

| | | | |
|---|---|---|---|
| 4,672,187 | 6/1987 | Fujita et al. | 250/201.5 |
| 4,718,052 | 1/1988 | Kondo et al. | 350/96.11 |
| 4,733,943 | 3/1988 | Suzuki et al. | 350/162.2 |
| 4,743,083 | 5/1988 | Schimpe | 350/96.19 |
| 4,760,568 | 7/1988 | Hine | 350/96.11 |
| 4,797,867 | 1/1989 | Sunagawa et al. | 350/96.11 |
| 4,857,719 | 8/1989 | Ando | 250/201.5 |
| 4,861,128 | 8/1989 | Ishikawa et al. | 350/96.12 X |
| 4,935,911 | 6/1990 | Ohuchida et al. | 369/44.11 |
| 4,943,129 | 7/1990 | Takeda et al. | 350/96.12 |
| 4,945,525 | 7/1990 | Yamamoto et al. | 369/44.12 |

FOREIGN PATENT DOCUMENTS

| | | | |
|---|---|---|---|
| 0202689 | 11/1986 | European Pat. Off. | 369/44.12 X |
| 58-130448 | 8/1983 | Japan | 369/44.12 X |
| 60-263350 | 12/1985 | Japan | 350/96.19 X |
| 62-97144 | 5/1987 | Japan | 369/44.12 X |
| 63-71946 | 4/1988 | Japan | 369/44.12 X |
| 63-229644 | 9/1988 | Japan | 369/44.12 X |

Primary Examiner—Brian Healy
Attorney, Agent, or Firm—Panitch, Schwarze, Jacobs & Nadel

[57] ABSTRACT

This invention provides an optical head apparatus in which a grating coupler (8), which is formed on a circular region which has a center on an axis (18) and has a periodical structure with dents and projections in a configuration of concentric circles or spirals around the axis (18), input-couples laser light (7) emitted from a semiconductor laser (5) and turns it into waveguided light (16B) which transmits in a waveguiding layer (15B). The waveguided light (16B) is converted, in a region where the waveguiding layer (15B) and a waveguiding layer (15A) overlap each other, to waveguided light (16A) which transmits in the waveguiding layer (15A). By a grating coupler (9), formed on a ring-shaped area which is located around the axis (18), which has a periodic structure with dents and projections of a configuration of concentric circles or spirals around the axis (18), the waveguided light (16A) is radiated and focused onto points (FA), (FB) and (FC) which are located on the axis (18). Light reflected from a reflecting surface (19) is input-coupled by the grating coupler (9) and is converted to waveguided light (21) which transmits through the waveguiding layer (15A) toward the center. The waveguided light (21) is radiated at the innermost edge of the waveguiding layer (15A) and the amount of radiated light is detected by a light detector (10) to obtained control signal and playback signals.

16 Claims, 14 Drawing Sheets

OPTICAL HEAD APPARATUS INCLUDING CONCENTRIC, PERIODIC GRATING IN A WAVEGUIDE

TECHNICAL FIELD

This invention relates to an optical head apparatus which records or reads information onto or out of optical disks.

BACKGROUND ART

Technologies by which optical head apparatuses that record or read information onto or out of optical disks are made into thin films have been proposed by, for example, the 46th academic lecture meeting 2p-L-15 of the Applied Physics Association of Japan. FIG. 1 shows the construction of this conventional thin film optical head apparatus.

In FIG. 1, the reference numeral 133 is a semiconductor laser, 132 is a waveguiding layer, 135 is a grating beam splitter (GBS), 136 is a focusing grating coupler (FGC), 11 is an optical disk, 140A, 140B and 141A, 141B are light detectors. The waveguiding layer 132 is formed over a substrate 131 to sandwich a dielectric layer with a low refractive index therebetween. Laser light emitted by the semiconductor laser 133 spreads while passing through the waveguiding layer 132 to become waveguided light 134 in a TE mode. The waveguided light 134 is converted to parallel light rays by the GBS 135 which is formed on the waveguiding layer 132, and a part of the parallel light becomes radiation mode light 137. The radiation mode light 137 is focused onto a focal point FC and is reflected by the reflecting surface of the optical disk 11 located at the focal point FC to return to the FGC 136 where it is converted to waveguided light again. The waveguided light is split by the GBS 135 into waveguided lights 138 and 139, which are then focused onto the light detectors 140A, 140B and 141A, 141B.

The reflecting surface of the optical disk 11 is provided with guide grooves running along the rotation direction 12 of the disk and arranged periodically in a radial direction, to thereby diffract the reflected light in the radial direction of the disk. Because the interference of the diffracted light causes tracking error (TE) appearing as an unevenness in the amount of the reflected light 137 in the radial direction of the disk, a TE signal can be obtained by measuring the amounts of waveguided lights 138 and 139 and taking the difference therebetween (so-called push-pull detection). By splitting the waveguided light by means of the GBS 135, the defocus of the optical disk reflecting surface is represented by the difference in the light amount distribution on the light detectors 140A and 140B or 141A and 141B, based on the same principle as the focus error (FE) detector by means of a knife edge. Consequently the TE signal is obtained by taking the difference between the summation signal of light detectors 140A and 140B and the summation signal of 141A and 141B by a differential amplifier 144, and the FE signal is obtained by taking the difference between the summation signal of light detectors 140A and 141A and the summation signal of 140B and 141B by a differential amplifier 143. On the other hand, the summation signal of the light detectors 140A, 140B, 141A and 141B is obtained by means of a summing amplifier 142 and is used as a reproduced signal.

However, optical head apparatuses of such a construction as described above have the following problems.

First, a semiconductor laser causes fluctuation in the wavelength depending on the temperature and the magnitude of the output power, so that the diffraction angle of light by the GBS 135 changes, causing the waveguided light 134 to be incident on the FGC 136 in a state that deviates from parallel light. Therefore, aberration (astigmatism in particular) is generated in the radiation light 137 due to unparallelism and the difference in the optical path. Also, because the diffraction angle of the radiation light 137 from the FGC 136 changes, the angle of incidence onto the optical disk 11 changes, and coma arises by the action of a transparent substrate which covers the reflecting surface of the optical disk. These aberrations cause the focusing characteristics of the light distribution on the reflecting surface to deteriorate and the reproduction performance (or recording performance) to decrease. Moreover, the light focusing points 138F and 139F of the two waveguided lights 138 and 139 which are focused on the light detectors 140A, 140B and 141A, 141B are dislocated as indicated by the arrows, because the diffraction angle of light on the GBS 135 changes in accordance with the wavelength fluctuation. This dislocation of the spot on the light detector disturbs the FE control signal resulting in a defocus on the reflecting surface of the optical disk, thereby to further lower the reproduction performance (or recording performance).

Second, if the thickness and the refractive index of the waveguiding layer deviate from the design values, the equivalent refractive index of the waveguiding layer also deviates, and the diffraction angle of light due to the GBS 135 deviates, causing the waveguided light 134 to enter the FGC 136 in a state that deviates from parallel light. The diffraction angle of the radiation light 137 from the FGC 136 also deviates. Similar to the wavelength fluctuation, aberration is generated in the radiation light 137, and focusing characteristics of the light amount distribution on the reflecting surface deteriorate, so that the reproduction (or recording) performance is lowered.

Third, in FIG. 2 which shows the intensity distribution of the light 145 emitted from the FGC, the output coupling efficiency $\eta_0$ of the FGC 136 is represented as $\eta_0 = $ (Distribution ratio) $\times$ (Light intensity of P1)/(Light intensity of P1+P2). P2 is the amount of radiation light when assuming that the grating of the FGC is extended. The distribution ratio in the case of 2-beam coupling is generally 0.5. When the radiation loss factor of FGC is increased, the intensity distribution shown in FIG. 2(a) is turned into the intensity distribution shown in FIG. 2(b) while (light amount of P1+P2) remaining constant. At this time, the output coupling efficiency $\eta_0$ increases because the light amount of P1 increases. However, the intensity distribution of FIG. 2(b) is uneven in comparison to the intensity distribution of FIG. 2(a), resulting in a decrease in NA and substantial deterioration of focusing characteristics at the focal point. That is, the output coupling efficiency and the light focusing characteristics are in an inverse relation.

Fourth, in FIG. 3 which shows the intensity distributions of the light 145 emitted from the FGC and of the returning light 146 which returns from the optical disk reflecting surface, the intensity distribution C of the returning light becomes symmetric with the intensity distribution A of the emitted light, by reflecting on the reflecting surface at the focal point. While the input coupling efficiency $\eta_1$ (coupling efficiency at which the returning light 146 is converted to waveguided light 147) generally increases when the output distribution and the input distribution of the grating coupler are orthomorphic, the input coupling efficiency $\eta_1$ is small because the intensity distribution of the returning light of C is not orthomorphic with the intensity distribution of the emitted light of A. In addition, although waveguided light which passes the grating coupler without being radiated and waveguided light with a vector opposite thereto are needed as a pumping light to increase the coupling efficiency at which the returning light is added to the waveguided light, the waveguided light of an opposite vector does not exist at the actual input coupling. Therefore, a requirement for an increase in the input coupling efficiency is that the waveguided light of the opposite vector is of a small amount, namely the amount of waveguided light which passes the grating coupler without being radiated is small (that is, the amount of P2 is small). Although P2 must be increased to obtain higher focusing characteristics as previously described, an improvement of the input coupling efficiency and an improvement in the focusing characteristics are in an inverse relation and are incompatible, as an increase in P2 results in a decrease in the input coupling efficiency. Therefore, by the principle, the input coupling efficiency of the returning light becomes low, and the light amounts detected by the light detectors 140A, 140B and 141A, 141B are low, resulting in poor qualities (S/N ratio) of the control signals and the reproduced signals.

Fifth, the diffraction efficiency of the transmitted light of the GBS 135 is low when the efficiency of the transmitted wave is high, and the efficiency of the transmitted wave is low when the efficiency of the diffraction wave is high. Therefore if the amount of light of the transmitted wave directed toward the FGC 136 is increased, the light amount of the diffracted waves directed toward the light detectors 140A, 140B and 141A, 141B becomes small, and if the amount of light of the diffracted waves directed toward the light detectors are increased, the amount of transmitted wave directed toward the FGC becomes small. In other words, the transmission efficiency of the light to the optical disk reflecting surface and the transmission efficiency thereof to the light detector cannot be improved at the same time. Also the transmitted wave of the returning light returns to the semiconductor laser 133 and the feedback coupling therewith causes a disturbance in the oscillation of laser.

Sixth, while the focusing characteristics (Strehl's Definition) is proportional to (Aperture of FGC)/(Focal distance of FGC)$^2$, because the focal distance cannot be decreased due to the vertical run-out of the optical disk and other causes, a sufficiently large aperture of the FGC (e.g., 4 mm × 4 mm) is needed to secure a sufficient level of focusing characteristics. The aperture of the FGC here means the area of the aperture for the radiation light on the FGC, and the aperture area is determined by the distance between the semiconductor laser and the FGC and by the spreading angle of the waveguided light 134 emitted from the semiconductor laser 133. As the spreading angle is as small as 10 to 20 degrees in the case of waveguided light of a TE mode, a relatively large distance (2-3 cm) between the semiconductor laser and the FGC is require for a sufficient FGC area (aperture area), which causes difficulty in making a compact apparatus.

Seventh, the grating of the FGC, which depicts a complicated curve (biquadratic equation), makes its processing difficult. Although some methods such as electron beam lithography are suited to a processing with complicated curves, the specified processing accuracy is guaranteed only for a small drawing area of 1 mm × 1 mm, and, therefore, they are not suitable for the processing of gratings with a sufficiently large area.

DISCLOSURE OF THE INVENTION

This invention is intended to solve such problems as described above and to provide a quite new optical head apparatus. The invention is characterized in that the periodical structure provided in the waveguiding path is formed into a concentric circle or spiral to focus waveguided light onto a point which is located outside of the waveguiding path. The invention is also characterized in that laser light from a laser light source installed outside of the waveguiding path is input into the inside of the waveguiding path by means of the waveguiding path with a periodical structural formed in the shape of a concentric circle or spiral within the waveguiding path or by means of the waveguiding path formed on a substrate with conical dents.

BEST MODE OF THE INVENTION

Examples of this invention are explained below. FIGS. 4 to 14 are related to the examples of this invention, in which the optical disk portion is denoted with the same numbers as those of the conventional apparatus.

Figure 1:
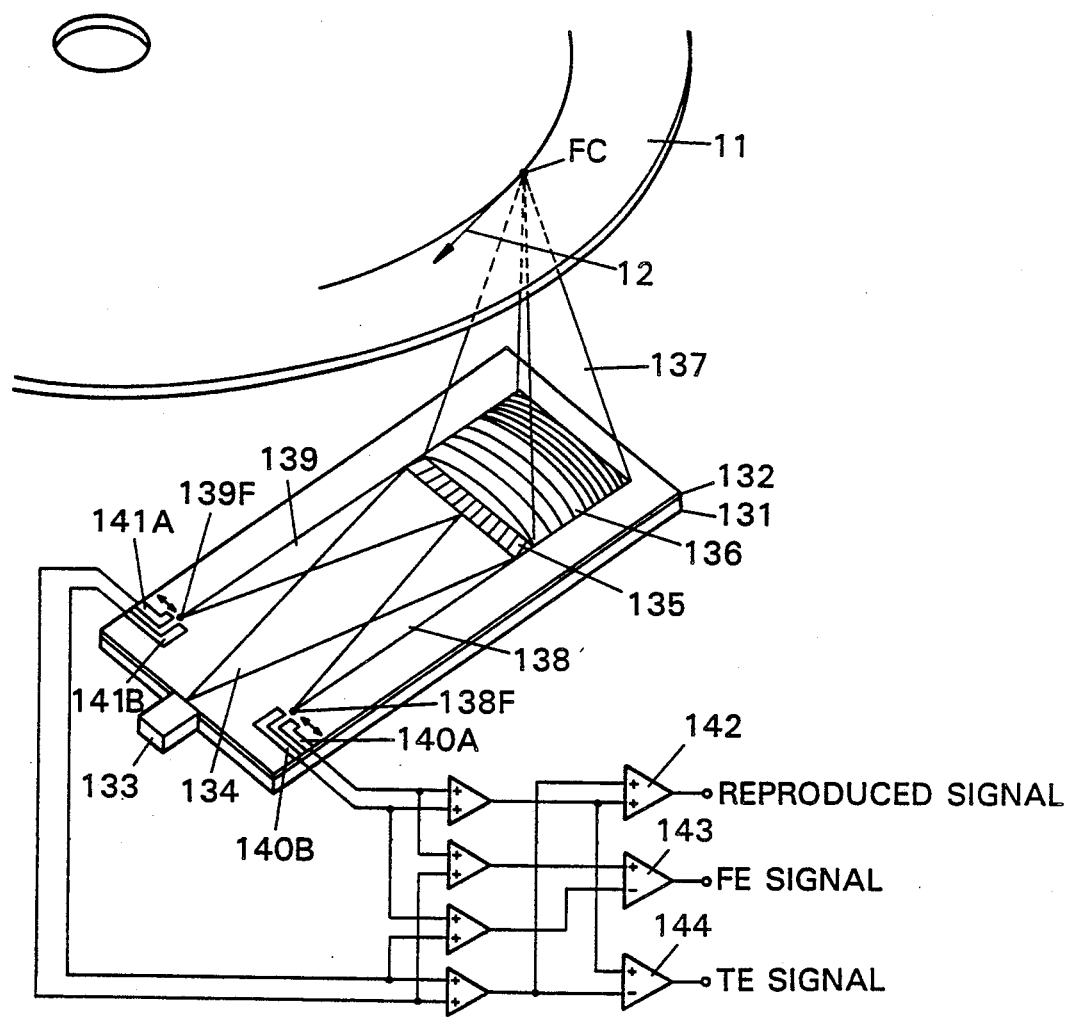
FIG. 1 is a structural view showing a conventional thin film optical head apparatus.
Figure 2A:
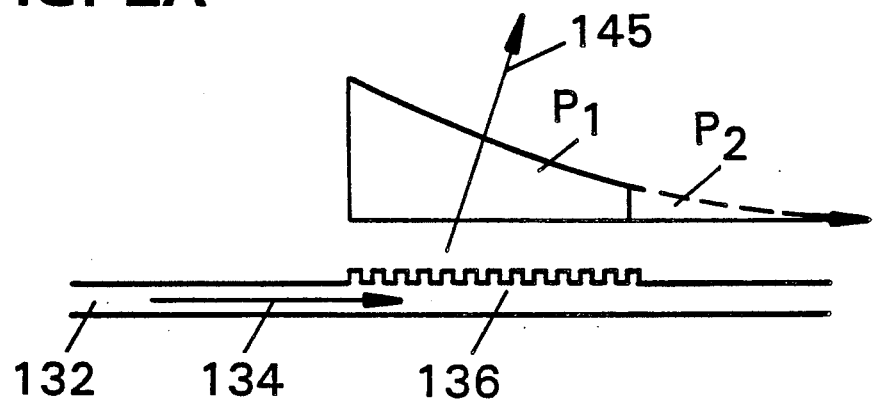
FIGS. 2(a) and 2(b) are diagrams showing the light intensity distributions of the light emitted from FGC of the conventional apparatus.
Figure 2B:
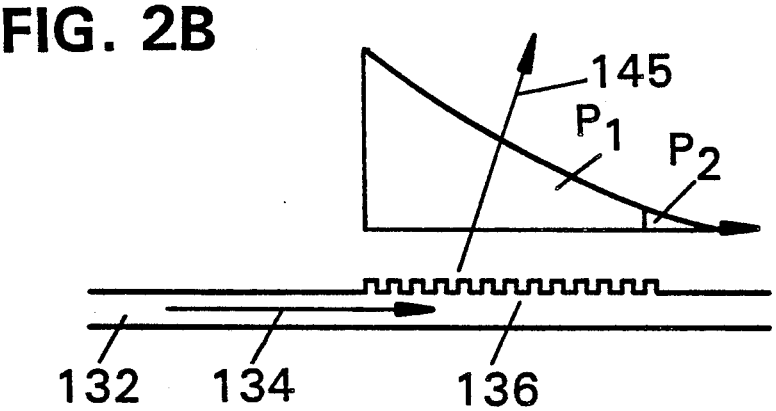
Figure 3:
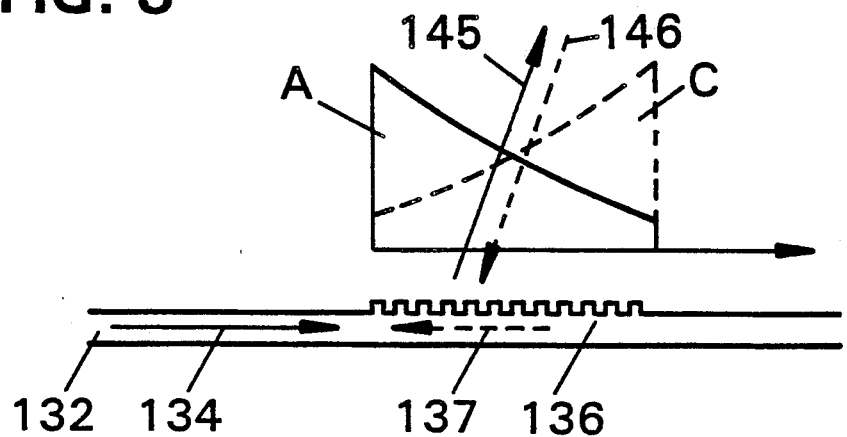
FIG. 3 is a diagram showing the light intensity distributions of the light emitted from FGC and the light returning from the reflecting surface of the optical disk of the conventional apparatus.
Figure 4:
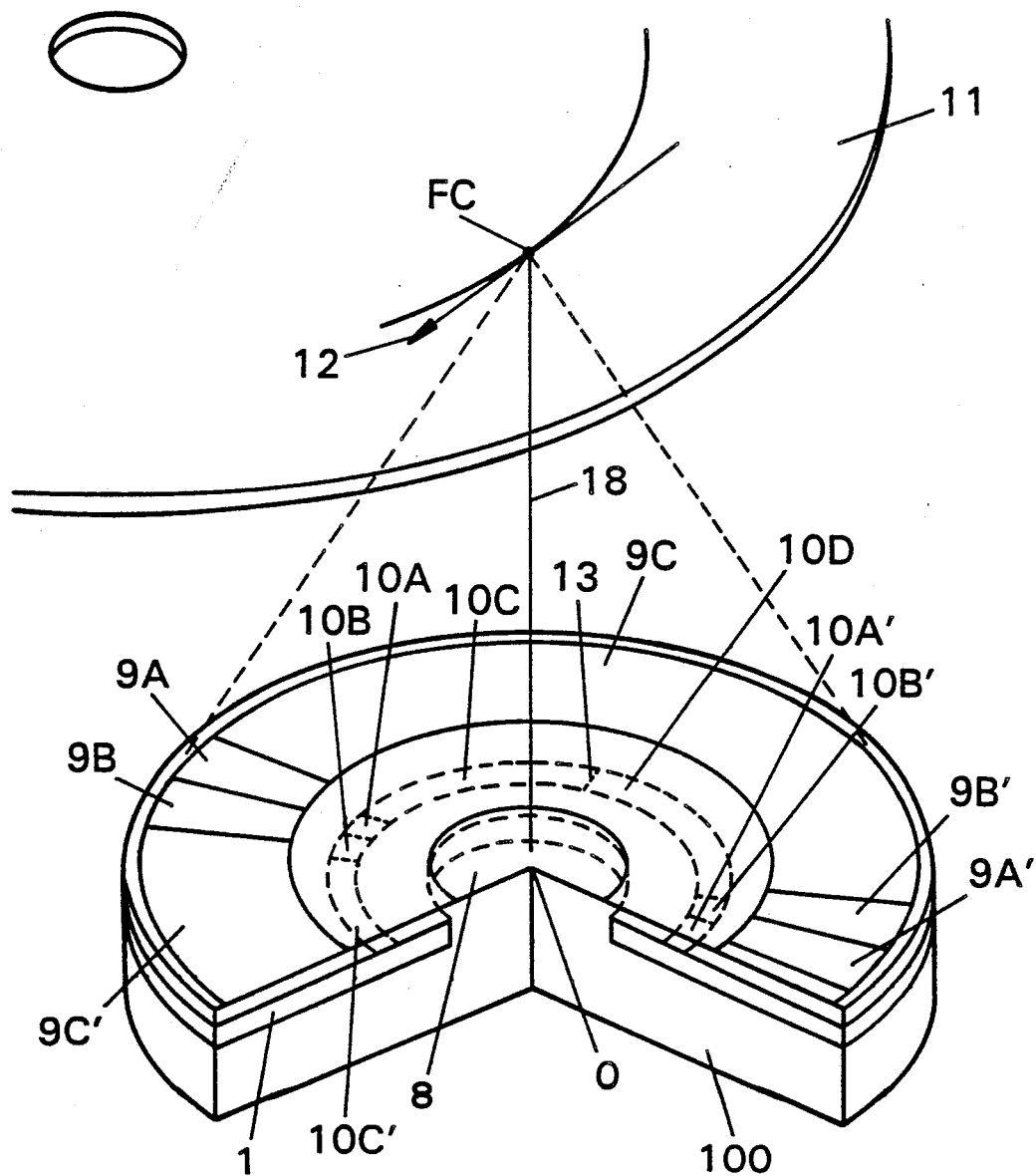
FIG. 4 is a structural view showing an optical head apparatus of an embodiment of this invention.
Figure 5:
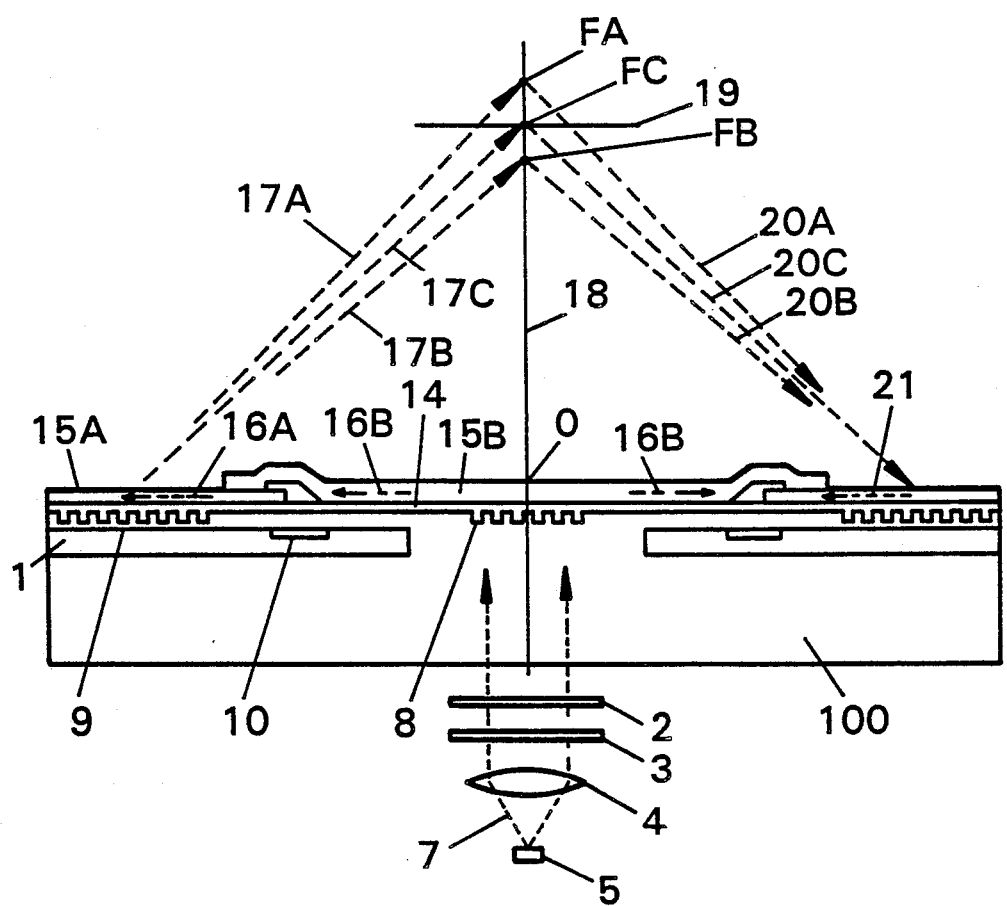
FIG. 5 is a cross sectional view illustrating the optical head apparatus of the embodiment of this invention.

In FIG. 4 and FIG. 5, a hollow substrate 1 is disposed on a transparent substrate 100 on the surface of which gratings 8 and 9 are formed. The transparent substrate 100 is made of, for example, a thermo-setting resin material or the like and the uneven surface of the gratings 8 and 9 are formed by transferring the grating of a stamper. The grating 8 is formed on a circular area around the axis 18 which passes through point 0 and is an uneven periodical structure that is concentric or spiral with respect to the axis 18. The grating 9 is formed on a ring-shaped area around the axis 18 and is an uneven periodical structure that is concentric or spiral with respect to the axis 18. The gratings 8 and 9 do not overlap each other, having ring-shaped gaps therebetween. The grating coupler 9 is divided into 6 areas (i.e., 9A, 9A', 9B, 9B', 9C and 9C') by three straight lines which pass the central point 0. The areas 9A', 9B' and 9C' are located at opposite positions to the areas 9A, 9B and 9C with regard to the central point 0, respectively. Gratings located opposite each other are of the same shapes (uneven structures). On the transparent substrate 100 are formed a dielectric layer 14 with a low refractive index, on which waveguiding layers 15A and 15B with refractive indexes higher than that of the layer 14 are formed. The refractive index of the waveguiding layer 15A is higher than that of the waveguiding layer 15B, and the thickness of the waveguiding layer 15A is smaller than that of the waveguiding layer 15B. The waveguiding layer 15A is formed on the ring-shaped areas around the axis 18, and the waveguiding layer 15B is formed on the circular area around the axis 18. The inner periphery of the waveguiding layer 15A and the outer periphery of the waveguiding layer 15B overlap so that the waveguiding layer 15B covers the waveguiding layer 15A. The overlapping region is located in the ring-shaped area between the grating coupler 8 and the grating coupler 9. On the substrate 1, a ring-shaped light detector 10 is formed at the innermost position of the waveguiding layer 15A.

The laser light 7 from a semiconductor laser 5 is made into parallel rays by a focusing lens 4. The laser light which has been converted to concentrically polarized light by a quarter-wave plate 3 and a polarizer 2 is input-coupled by the grating coupler 8 and becomes waveguided light 16B in a TE mode or a TM mode which is transmitted in the waveguiding layer 15B in the radiation direction. The waveguided light 16B becomes waveguided light 16A while passing from the waveguiding layer 15B to the waveguiding layer 15A. This waveguided light is radiated by the grating coupler 9 and becomes radiation mode lights 17A, 17B and 17C which are focused onto points FA, FB and FC, respectively, on the axis 18. The point FC is positioned between the points FA and FB. The radiation mode light 17A is radiated from the grating couplers 9A and 9A', the light 17B is radiated from 9B and 9B', and the light 17C is radiated from 9C and 9C', respectively. The reflecting surface 19 of the optical disk 11 crosses the axis 18 at right angles and is nearly positioned at the focal point FC, and the light is reflected by the reflecting surface 19. In other words, the radiation mode lights 17A, 17B and 17C are turned into reflected lights 20A, 20B and 20C, respectively, and are input-coupled by the grating coupler 9 to be converted to the waveguided light 21 which is directed to the center of the waveguiding layer 15A. The waveguided light 21 is radiated at the innermost end of the waveguiding layer 15A and the amount of light is measured by the light detector 10 provided on the substrate 1.

Figure 6:
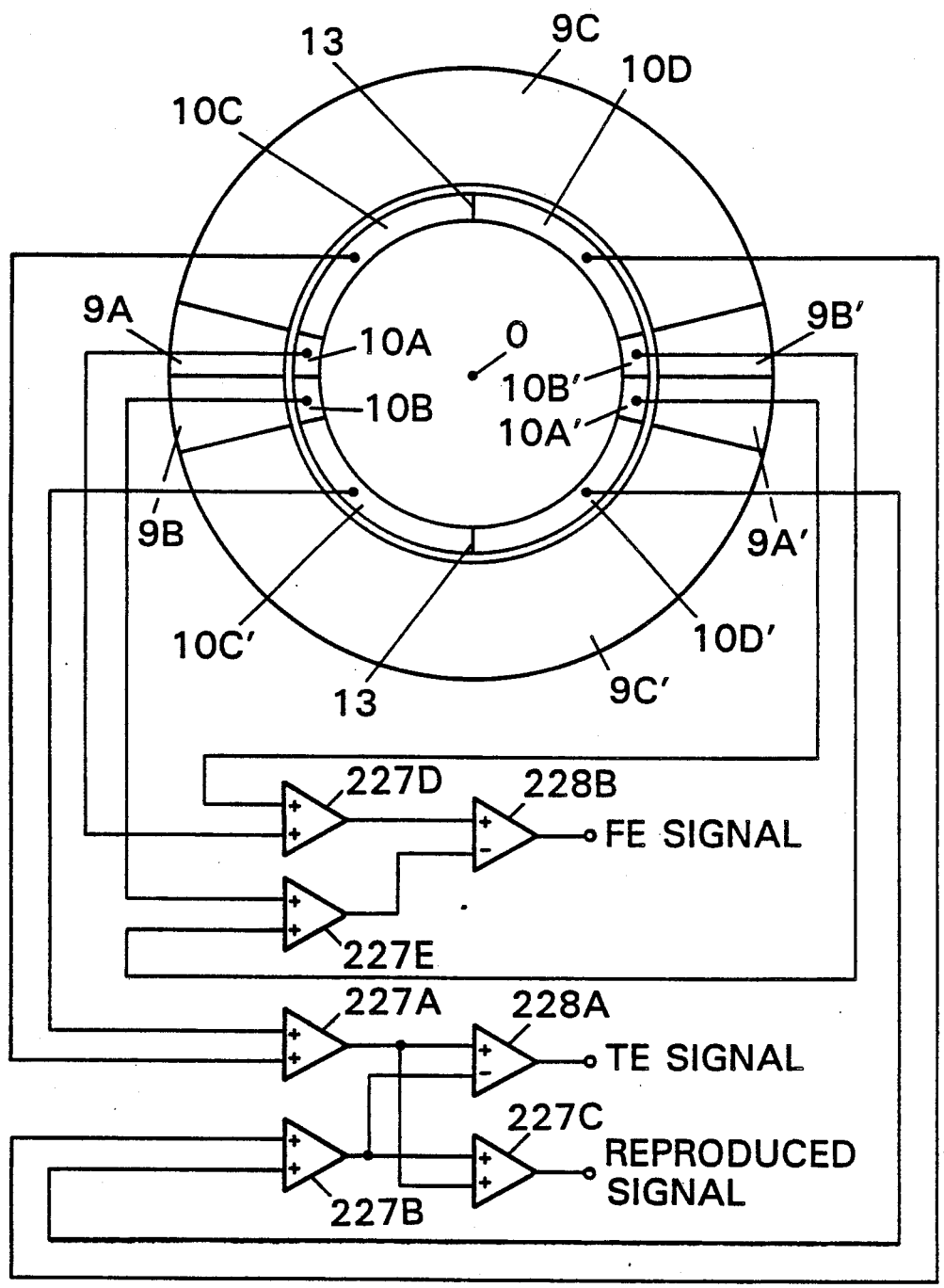
FIG. 6 is a schematic diagram showing the signal detection in the embodiment of this invention.

FIG. 6 is a schematic diagram showing the signal detection in the above-mentioned example of this invention. As previously mentioned, the grating coupler 9 is divided into 6 areas (i.e., 9A, 9A', 9B, 9B', 9C and 9C') by three straight lines which pass the central point 0. The light detector 10 is divided into eight areas, (i.e., 10A, 10A', 10B, 10B', 10C, 10C', 10D and 10D') by four straight lines which pass the central point 0. The areas 10C, 10D and 10C', 10D' are equally divided by a division line 13 while facing the inner periphery of the grating couplers 9C and 9C', respectively, and detect the amount of waveguided light which is input-coupled by 9C and 9C'. The areas 10A, 10B, 10A' and 10B' also face the inner periphery of 9A, 9B, 9A' and 9B', respectively, and detect the amount of waveguided light which is input-coupled by the corresponding grating couplers. The division line 13 is parallel to the rotation direction 12 of the disk shown in FIG. 4. Summing amplifiers 227A and 227B generate the summation signals of 10C and 10C' and the summation signals of 10D and 10D', and a differential amplifier 228A takes the difference between these summation signals, which makes a TE signal, and a summing amplifier 227C adds them to make a reproduced signal. On the other hand, summing amplifiers 227D and 227E generate the summation signals of 10A and 10A' and the summation signals of 10B and 10B', from which an FE signal is generated by a differential amplifier 228B which takes their difference.

Figure 7:
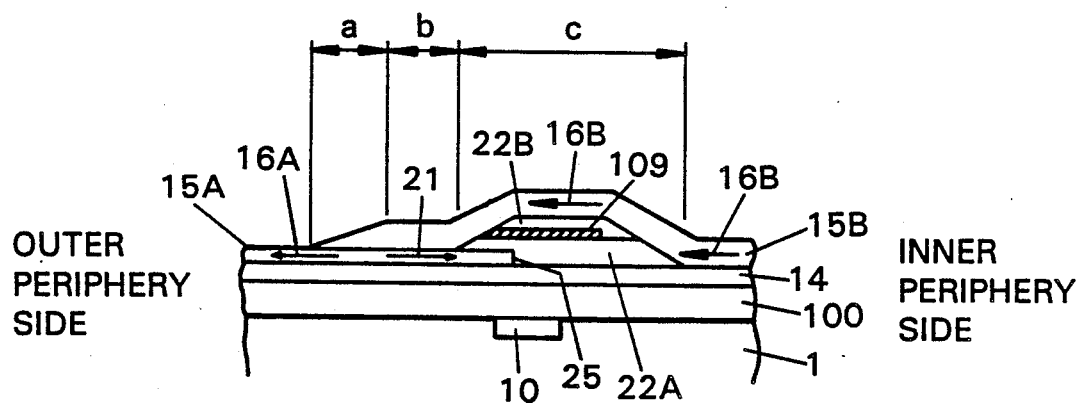
FIG. 7 is a cross sectional view showing a waveguided light splitter section of the embodiment of this invention.

FIG. 7 is a cross sectional view of the waveguided light splitting section where the waveguiding layers 15A and 15B overlap each other. The waveguided light 16B which is transmitted through the waveguiding layer 15B toward the outer periphery moves, in the region b, to the waveguiding layer 15A with a high refractive index and is converted to the waveguided light 16A which is transmitted through the waveguiding layer 15A toward the outer periphery. The equivalent refractive index of the waveguided light generally increases monotonically with the film thickness. Consequently, the film thickness of the waveguiding layer 15B is greater than that of the waveguiding layer 15A while the refractive index of the waveguiding layer 15B is lower than that of the waveguiding layer 15A, so that there is a small difference between the equivalent refractive index of the waveguided light transmitting through the waveguiding layer 15B and that of the waveguided light transmitting through the waveguiding layer 15A, resulting in small losses based on the transit of the waveguided light from the inside of the waveguiding layer 15B to the inside of the waveguiding layer 15A. Moreover, because the thickness of the waveguiding layer 15B gradually becomes thin in the region a, the equivalent refractive index of the waveguiding layer 15A in this region has less diocontinuity and the loss that the waveguided light 16A undergoes is small. Also because the thickness of the waveguiding layer 15B is greater than that of the waveguiding layer 15A, the shape of the waveguiding layer 15B in the region c has less discontinuity and the loss that the waveguided light 16B undergoes is small. In this way, the waveguided light 16B is efficiently converted to the waveguided light 16A with a small transmission loss of the waveguided light in the waveguided light splitting section. In contrast to this, the waveguided light 21 which transmits through the waveguiding layer 15A toward the inner periphery is radiated because the waveguiding path is interrupted at the edge 25 of the waveguiding layer 15A. Because a part of this radiation light which radiates toward the waveguiding layer 15B is reflected on a reflecting layer 109, the larger part of the radiation light is detected by the light detector 10. Dielectric layers 22A and 22B with a refractive index lower than that of the waveguiding layer are disposed between the reflecting layer 109 and the waveguiding layer 15A and between the waveguiding layers 15A and 15B, respectively, so that the reflecting layer 109 is not in direct contact with the waveguiding layers, and absorption of the waveguided lights 16B and 21 by the reflecting layer 109 is low. Moreover, because streak light (scattered light) of the waveguided light 16B in the region c is intercepted by the reflecting layer 109, a contamination of noise components into the light detector 10 can be prevented. As described above, the waveguided light is efficiently transmitted toward the outer periphery while it is not transmitted toward the inner periphery but radiated, and consequently both the transmission efficiency of light to the reflecting surface of the optical disk and the transmission efficiency thereof to the light detector can be improved at the same time without causing feedback to the semiconductor laser 5.

The principle of signal detection of the optical head apparatus of this invention which is constructed as described above is explained in the following.

Figure 8:
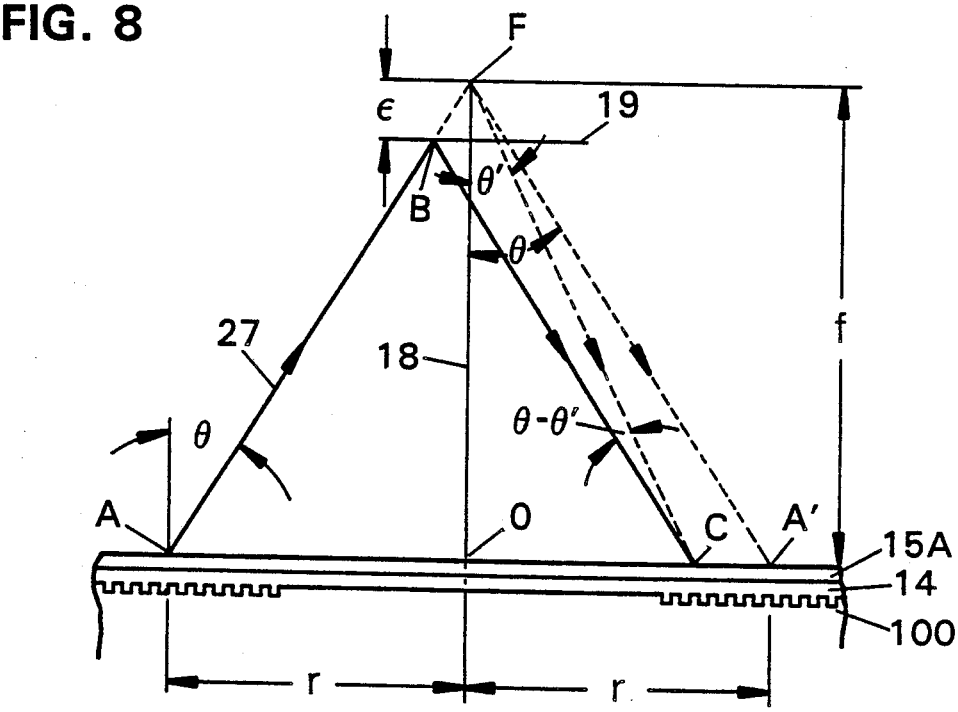
FIG. 8 is a schematic diagram showing the change of the incident angle of the returning light in the embodiment of this invention.

FIG. 8 is a schematic diagram showing the change in the incident angle of the returning light. The grating pitch Λ at an emitting position A of radiation mode light is given as follows as a function of radius r.

$$\Lambda = \lambda/(N + r/(f^2 + r^2)^{\frac{1}{2}}) \quad (1)$$

This means that the characteristics of focusing light on the focal point F are improved by constituting the grating so that its pitch Λ is represented as a function of radius r. In this equation, λ is the wavelength of laser light, N is the equivalent refractive index of the waveguiding path, and f is the focal length. (In practice, the reflecting surface of the optical disk is covered by a transparent sheet, and spherical aberration which occurs when converged light transmits through a parallel plate must be corrected and the correction term must be added to the equation (1).) The diffraction angle θ of the radiation mode light 27 is given by the following equation.

$$\sin \theta = \lambda/\Lambda - N \quad (2)$$

θ, r and f are related with each other by the following equation.

$$\tan \theta = r/f \quad (3)$$

Although light is reflected in the order of AFA' when the reflecting surface 19 is positioned at the focal point F, it is reflected in the order of ABC when the reflecting surface 19 is nearer to (or away from) the focal point F by the distance ε. Although the light that is incident on point C of the grating coupler in the direction FC is efficiently converted to waveguided light, the conversion efficiency (input coupling efficiency) decreases as the incident direction deviates from the direction FC. The angle deviation (θ − θ') from the direction FC is approximated as follows.

$$\theta - \theta' = \tan^{-1}(2\epsilon r/(f^2 + r^2)) \quad (4)$$

Consequently, the deviation angle (θ − θ') increases with an increase in ε, causing a decrease in the conversion efficiency.

Figure 9A:
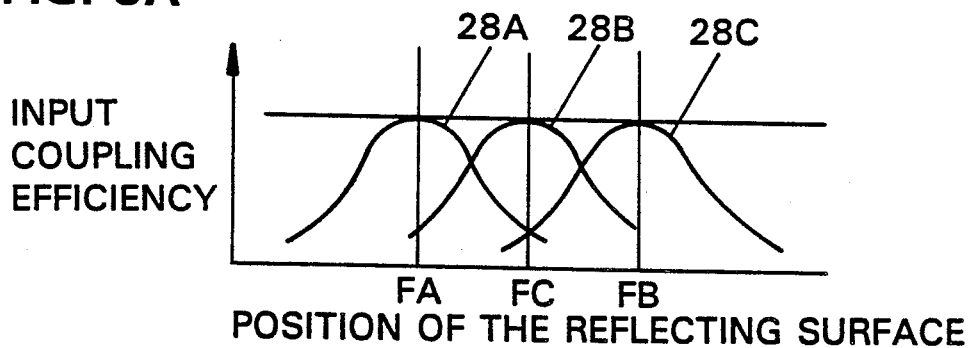
FIGS. 9(a) and 9(b) are of graphs showing the change of the input coupling efficiency of the returning light and the change of the FE signal output with the change of the position in the reflecting surface in the embodiment of this invention.
Figure 9B:
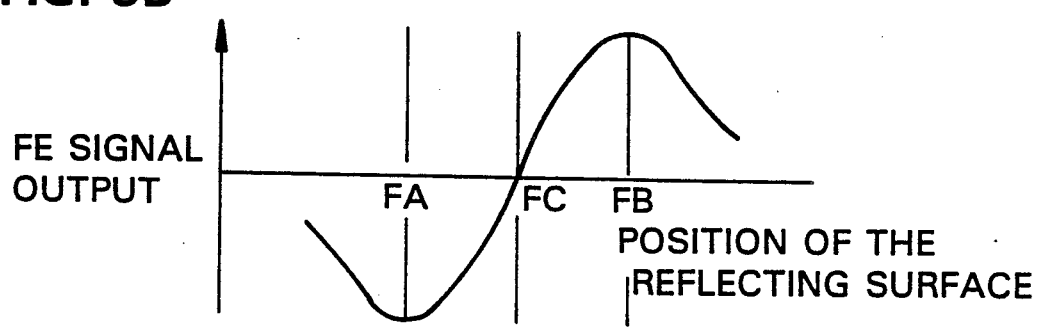

FIG. 9(a) is a schematic diagram showing the change in the input coupling efficiency of the returning light with the change of the position of the reflecting surface, and 9(b) is a schematic diagram showing the change of the FE signal output with the change of the position of the reflecting surface. As is clear from equation (4), the input coupling efficiencies 28A and 28B of the returning light which is converted to waveguided light by the grating couplers 9A and 9B (or 9A', 9B') vary with the change of the reflecting surface position, and the coupling efficiency 28A becomes maximum when the reflecting surface is positioned at FA, and the coupling efficiency 28B becomes maximum when the reflecting surface is positioned at FB. Because the coupling efficiency is directly proportional to the amount of waveguided light, the FE signal which is given as a difference between the summation signal of 10A and 10A' and the summation signal of 10B and 10B' changes along an S curve with the defocus of the reflecting surface as shown in 9(b), indicating that the focus control can be carried out.

In a case where wavelength fluctuation occurs in the semiconductor laser or film forming errors (thickness error, refractive index error, etc.) occur in the waveguiding layer, focal points FA, FB and FC undergo a similar displacement while maintaining their relative position. At this time, the relationship between the coupling efficiencies of the grating couplers does not change because the relative positions therebetween are maintained. Therefore, according to the method for the FE detection of this invention, the defocus due to the wavelength fluctuation or the film forming error of the waveguiding layer does not occur as far as the FE control is effected, without deterioration in the reproduction (or recording) performance.

As shown in FIG. 4, guide grooves or pits are formed with periodical repetition along the disk rotation direction 12 in the radial direction on the reflecting surface of the optical disk 11, so that the reflected light is diffracted in the radial direction of the disk. Therefore, tracking error appears in the form of an uneven light intensity distribution of reflected light 20C in the radial direction of the disk. Consequently a TE signal can be obtained by dividing the waveguided light 21 in the disk rotation direction 12, detecting the amount thereof, and taking their difference. Thus, the TE signal can be obtained from the differential amplifier 228A. Also, because the signal (pit or dot) on the reflecting surface of the optical disk appears as a variation of the intensity distribution of the reflected light 20C or a variation in the amount of light, namely a variation of the amount of waveguided light 21, reproduced signals such as pit signals or dot signals can be obtained from the summing amplifier 272C. As shown in FIG. 9(a), the coupling efficiency 28C of the grating coupler 9C is maximum and the S/N ratio of the reproduced signal is high when the reflecting surface is positioned at FC.

The method for the focus separation in the optical head apparatus of this invention is explained in the following.

Grating pitch $\Lambda$ is given by equation (1) as a function of the radius r. The focal points can be separated to focus the light onto the focal points FA, FB and FC by giving different values to the focal length f of the grating couplers 9A, 9B and 9C (or 9A', 9B' and 9C') (in other words by making the uneven periodical structure of the grating different in each region). Equation (2) indicates that the focal points can also be separated by fixing the focal length f (namely, using the same uneven periodical structure in the grating couplers 9A, 9B and 9C) and changing the equivalent refractive indexes N in the grating couplers 9A, 9B and 9C. When the thickness of the waveguiding layer is increased in the order of 9A, 9C and 9B, for example, the equivalent refractive index N increases in this order, thereby easily separating the focal points. The equivalent refractive index N can be differentiated also by loading materials of different refractive indexes on the waveguiding layer.

Figure 10A:
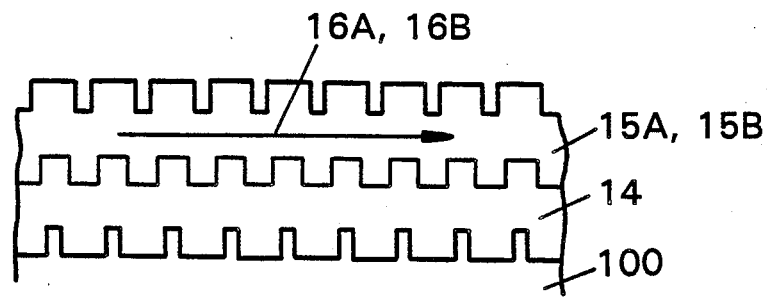
FIG. 10 is a schematic diagram showing the grating coupler in the embodiment of this invention.
Figure 10B:
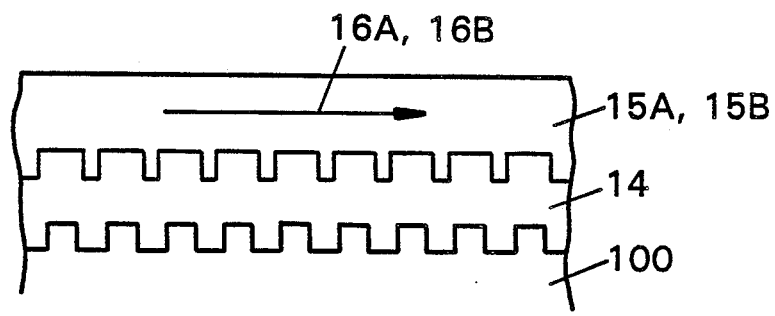

The principle in which light from a light source is input with the optical head apparatus of this invention is explained in the following. FIG. 10 is a cross section view of the grating coupler. The grating configuration of the interface between the layers that constitute a laminated layer changes with the thickness of the laminated layer, and the width of a portion projecting from the laminated layer in the laminating direction generally increases with an increase in the thickness of the laminated layer. When a rectangular configuration is assumed for the grating, as shown in FIG. 10(a), the width of the projecting portion of the interface between the dielectric layer 14 and the waveguiding layer 15B (or 15A) and the width of the projecting portion of the interface between the waveguiding layer 15B (or 15A) and air are larger than that of the surface of the transparent substrate 100. When the width of the projecting part of the transparent substrate 100 is large, as shown in FIG. 10(b), dents of the interface between the waveguiding layer 15B (or 15A) and air are filled up, which sometimes makes the top surface of the waveguiding layer nearly flat. In FIG. 10(a), both the interface between the dielectric layer 14 and the waveguiding layer 15B (or 15A) and the interface between the waveguiding layer 15B (or 15A) and air are formed into an uneven shape, and the waveguided light changes into radiation mode light in the grating region. Therefore, the input light oscillates to become waveguided light 16B in the grating coupler 8, and waveguided light 16A is radiated in the grating coupler 9. Also in FIG. 10(b), because the interface between the dielectric layer 14 and the waveguiding layer 15B (or 15A) is formed into an uneven shape, where input and output of light are performed. The grating pitch which meets the light input/output requirements satisfies equation (1) and in the grating coupler 8, for example, parallel light is incident. Therefore, the focal length becomes infinity f→∞ in equation (1), and $\Lambda$ is represented by the equation, $\Lambda = \lambda/N$. The light incident on the grating coupler 8 is not necessarily a parallel light, and the focusing lens 4 can be dispansed with if the grating pitch is modulated with the position according to equation (1).

Figure 11A:
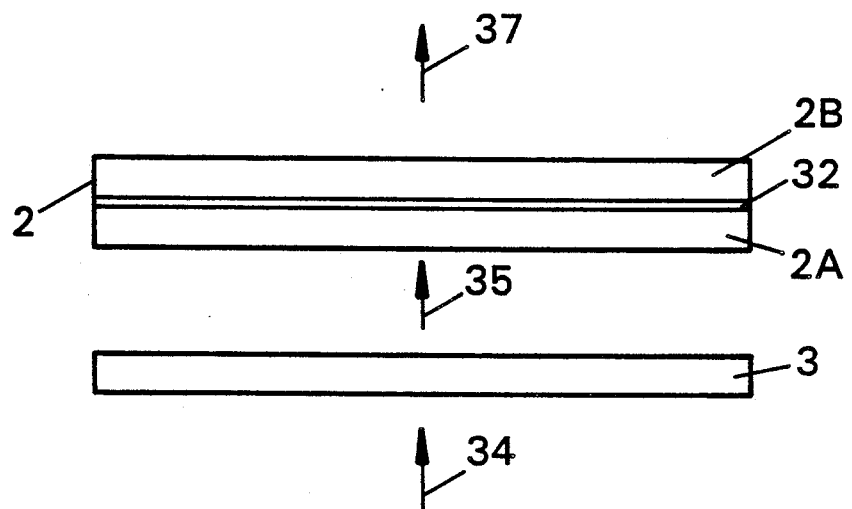
FIGS. 11(a) and 11(b) are schematic diagrams showing the principle of converting the linear polarization to circular polarization of concentric circles in the embodiment of this invention.
Figure 11B:
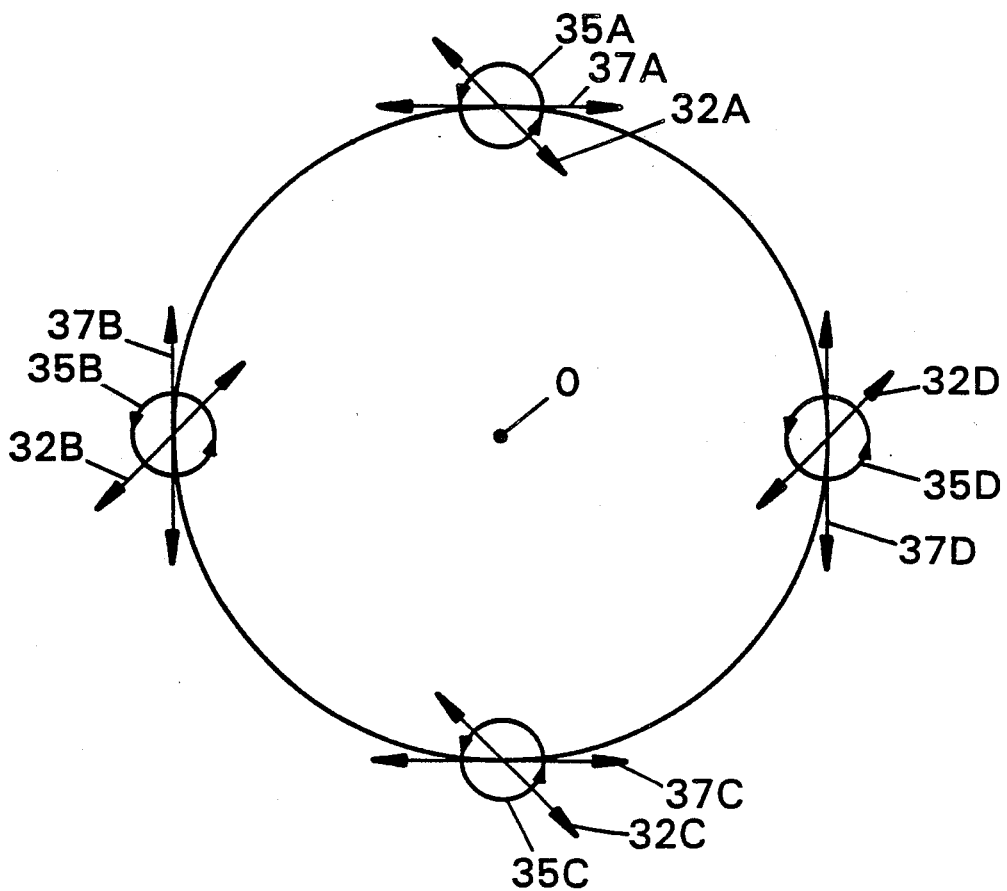

FIG. 11 is a schematic diagram showing the principle of a conversion of linear polarization into concentrically circular polarization. Laser lights 34 which has been collimated by the focusing lens 4 is linearly polarized, and is turned into light beams 35 of a circular polarization (polarization directions 35A, 35B, 35C, and 35D) by passing through a quarter-wavelength plate 3. The polarizer 2 is made of a homogeneous liquid crystal element, and a homogeneous liquid crystal 32 is disposed between the transparent substrates 2A and 2B. The surfaces of the transparent substrates 2A and 2B are rubbed out in directions (32A, 32B, 32C and 32D) inclined by 45 degrees against the tangential direction of the concentric circles which have the common central point 0, and the homogeneous liquid crystal 32 is also oriented in this direction. By designing the homogeneous liquid crystal 32 so that the component of the transmitted light in the direction or orientation lags (or advances) by a quarter wavelength, the circularly polarized light 35 can be turned into concentrically polarized light 37 (directions of polarization: 37A, 37B, 37C, and 37D). When light that is polarized in such a manner as the electric filed vectors are oriented in a concentric configuration is input-coupled in the waveguiding layer 15B by the grating coupler 8, the waveguided light 16B becomes TE mode light, or if it is polarized in such a manner that the magnetic field vectors are oriented in a concentric configuration, the waveguided light becomes TM mode light. In a case where the waveguided light 16A is TE mode light, light polarized to have electric field vectors oriented in concentric configuration is radiated by the grating coupler 9, and in a case where the waveguided light 16A is TM mode light, light polarized in such a manner that magnetic field vectors are oriented in a concentric configuration is radiated. The polarizer 2 can be omitted. In this case, if the grating pitch of the grating coupler 8 is designed for the TE mode coupling (namely, as the solution of equation (1) to the equivalent refractive index of waveguided light of TE mode), the waveguided light 16B becomes TE mode light, or if designed for TM mode coupling, it becomes TM mode light.

Figure 12:
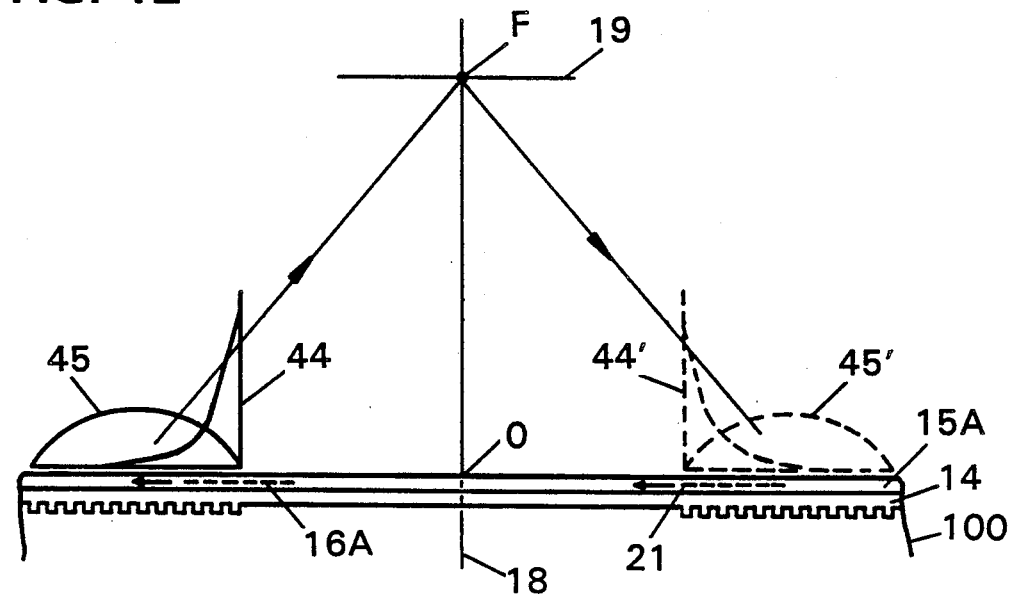
FIG. 12 is a diagram showing the intensity distributions of the light emitted from the grating coupler and the returning light in the embodiment of this invention.

The principle with regard to the output of waveguided light and the input of returning light is explained in the following. FIG. 12 is a schematic diagram showing the intensity distributions of the light emitted from the grating coupler and the returning light. In general, when the radiation loss coefficient of the grating is constant, independent of its position, radiated light shows the intensity distribution 44 where it decreases exponentially from the inner periphery toward the outer periphery. The output coupling efficiency (ratio of the amount of radiated light to the amount of waveguided light) in the grating coupler region can be increased by increased the radiation loss coefficient of the grating, and the output coupling coefficient becomes maximum when the intensity distribution of the radiated light in the grating region decreases in the waveguiding direction to become 0. At this time, although a light intensity distribution of radiated light with a substantially small aperture area (namely NA) can be obtained by increasing the radiation loss coefficient, this light intensity distribution has an aperture which has a configuration of ring-shaped area surrounding the axis 18 and therefore the degree of a decrease in the aperture area is low and the deterioration of the focusing characteristics at the focal point F is small. It should be noted that the intensity distribution of the radiated light can be changed by changing the radiation loss coefficient according to the position. For example, distribution 45 where the peak intensity of the radiated light is shifted toward the periphery can be obtained by decreasing the radiation loss coefficient from the outside toward the inside. The NA of the light intensity distribution 45 is substantially larger than that of the distribution 44, and the focusing characteristics of light of the distribution 45 is better than that of the distribution 44. With either the light intensity distribution 45 or 44, because the intensity distribution of the radiated light decreases in the waveguiding direction and becomes 0 in the grating coupler region, its output coupling efficiency becomes maximum and it is easy to improve both the output coupling efficiency and the focusing characteristics. That the amount of the waveguided light which passes through the grating coupler without being radiated is zero means that the waveguided light is not required for pumping when input-coupling the returning light with the waveguided light. The input coupling efficiency of the returning light is high. On the other hand, the intensity distribution of the returning light becomes the distributions (44′, 45′) which are symmetric with the intensity distribution of the radiated light with respect to the axis 18 by reflecting on the reflecting surface 19 at the focal point, and is orthomorphic with the intensity distribution of the radiated light at the position of the returning light. Namely, the intensity distributions of the output light and the input light of the grating coupler are orthomorphic with each other and, together with the above-mentioned fact that the amount of waveguided light which passes through the grating coupler without being radiated can also be made zero, the input coupling efficiency $\eta_1$ becomes maximum and the returning light is efficiently converted into the waveguided light 21. Consequently, the amount of light which is detected by the light detector 10 is large and, therefore control signals and reproduced signals of high quality can be obtained. The radiation loss coefficient can be controlled by means of the grating configuration, for example the ratio of the width of the projecting part to the pitch thereof and the height difference between the dents and the projections (difference in the refractive index in the case of grating by refractive index modulation).

The aberration characteristics of the optical head apparatus of this invention is explained in the following.

Changes (longitudinal aberration) df of the focal length when the wavelength undergoes a change of dλ are given below from equations (2) and (3).

$$df = fd\lambda/\lambda \cdot (\sin \theta = N - \lambda dN/d\lambda)/ \sin \theta \cos^2 \theta \quad (5)$$

(Note that the change of N with a change of dλ is generally small, and the value of λdN/dλ is of the order of 1/10 of (sin ϵ+N) and is negligible.) The change df of the focal length when the equivalent refractive index changes by dN is $$df = -fdN/ \sin \theta \cos^2 \theta \quad (6)$$

Figure 13:
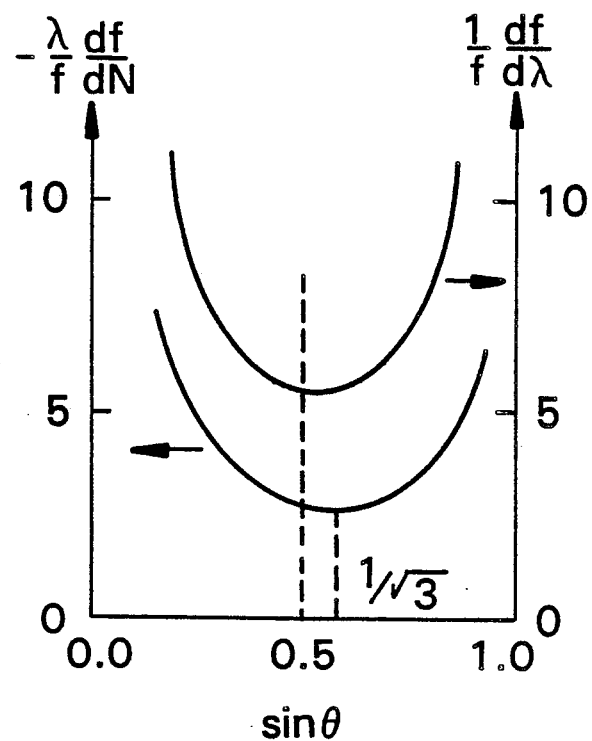
FIG. 13 is a graph showing the relation between the longitudinal aberration df and sin $\theta$ in relation to the wavelength fluctuation and the change in the equivalent refractive index in the embodiment of this invention.

FIG. 13 shows the relationship between the longitudinal aberration df (each normalized to df/fd and −df/fdN) and sin θ with changes in the wavelength and in the equivalent refractive index. A value of −df/fdN traces a curve which is convex downward and becomes minimum when sin $\theta = \frac{1}{3}^{\frac{1}{2}}$, and a value of λdf/fdλ traces a curve which is convex downward and becomes minimum when sin $\theta = 0.5 \sim \frac{1}{3}^{\frac{1}{2}}$. Therefore, if the grating coupler 9 is of a configuration which has a ring-shaped aperture near sin $\theta = 0.5 \sim \frac{1}{3}^{\frac{1}{2}}$ longitudinal aberration due to a variation in the wavelength and a variation in the equivalent refractive index is almost constant, independent of sin θ (namely the aperture position), which indicates that the aberration is absorbed by a displacement of the focus position and does not affect the focusing characteristics (Strehl's Definition). Because the displacement of the focus occurs in the direction normal to the reflecting surface of the optical disk, the incident angle onto the reflecting surface does not change and no coma is caused by the action of the transparent substrate which covers the reflecting surface of the optical disk. Consequently, the deterioration of the focusing characteristics due to the error factors such as a variation in the wavelength, a variation in the equivalent refractive index, etc., is small and a decrease in the reproduction (or recording) performance is also small.

Figure 14:
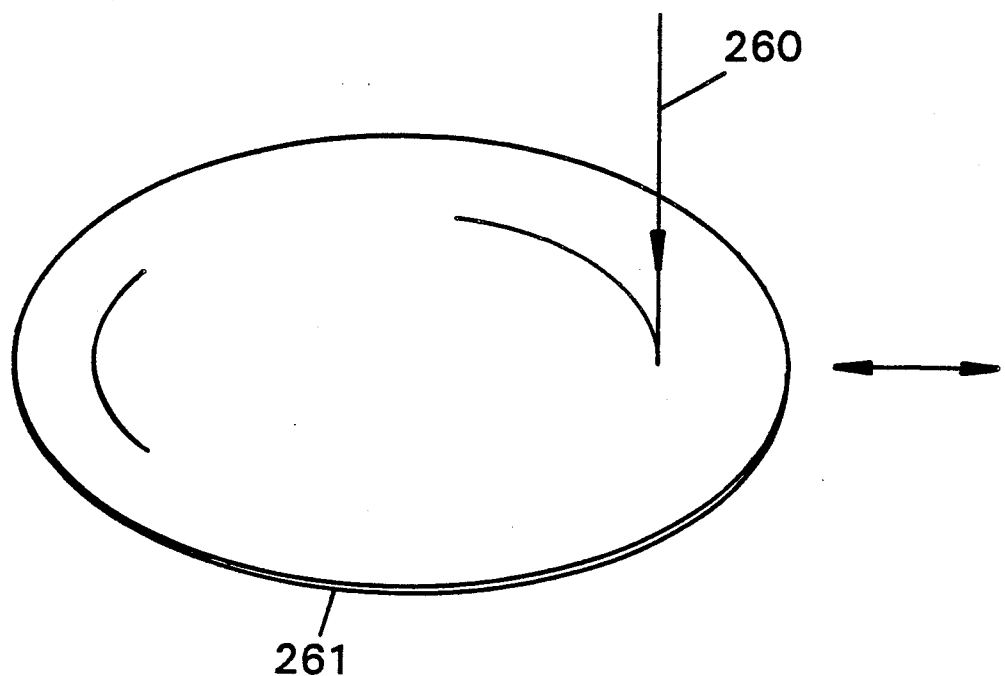
FIG. 14 is a schematic diagram showing the method for manufacturing the grating coupler in the embodiment of this invention.
Figure 15A:
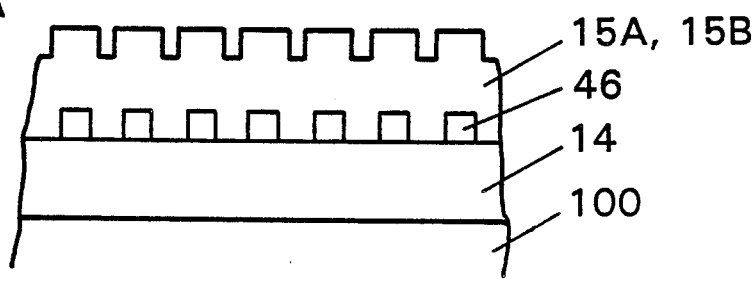
FIGS. 15(a)–15(e) are cross sectional views showing other embodiments of this invention with regards to the type of the grating.
Figure 15B:
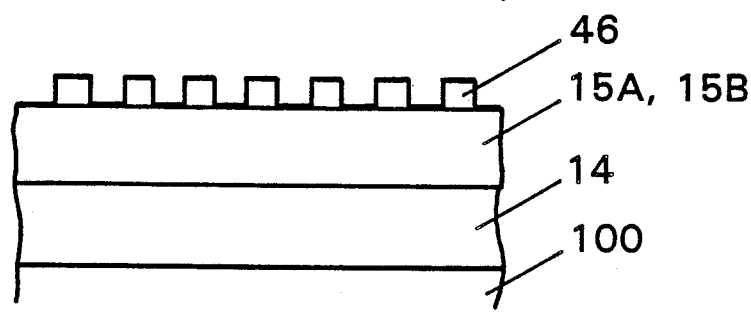
Figure 15C:
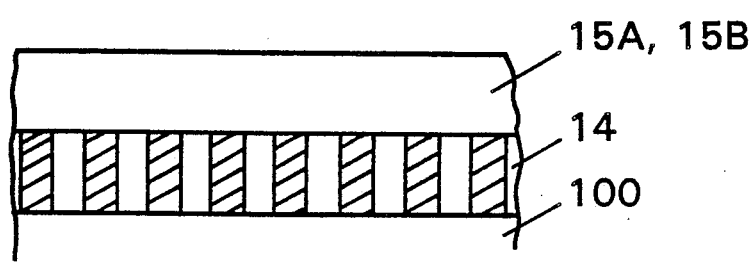
Figure 15D:
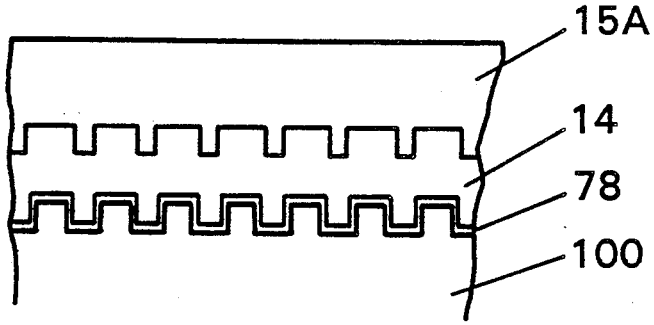
Figure 15E:
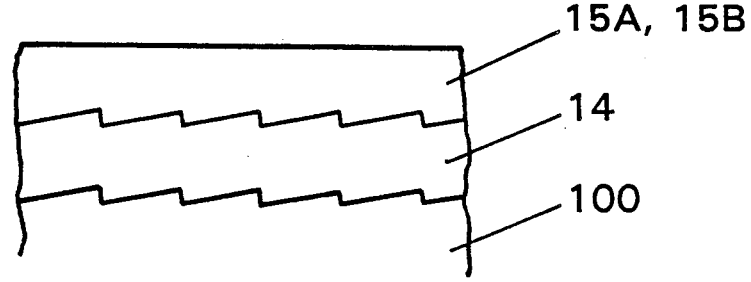

In the optical head apparatus of this invention, because the waveguided light is transmitted in every direction while being radiated along the waveguiding path from the central point 0, a sufficiently large FGC (namely the aperture area of the radiated light) can be obtained in spite of a small distance between the central point 0 and the FGC, making it easy to make a compact apparatus. And the gratings of the grating couplers 8 and 9, which are made in a configuration of concentric circles or a spiral, are easily manufactured. FIG. 14 is a schematic diagram showing the method of processing the grating coupler. The grating is made by irradiating an energy beam 260 such as electrons or the like onto a substrate 261, which is coated with a photoresist, while rotating and shifting the substrate. The energy beam is fixed and therefore the processing accuracy for the grating is determined by the accuracy of feeding the substrate. The processing accuracy of rotary objects is generally high, and gratings of a large area can be formed with high accuracy.

FIG. 15 shows the other type of grains of this invention. As in the case of the above example, the dents and projections of the grating are not necessarily formed on the surface of the transparent substrate 100, but can be formed by periodically loading a dielectric material 46 on the surface of the dielectric layer 14 as shown in FIG. 15(a), or can be formed by loading the dielectric material 46 on the surfaces of the waveguiding layers 15A and 15B as shown in FIG. 15(b). The grating can also be formed by etching the surface of the dielectric layer 14 and the surfaces of the waveguiding layers 15A and 15B. In addition, refractive index modulation type gratings can also be possible besides the so-called relief type gratings as mentioned above. FIG. 15(c) shows an example of a refractive index-modulated dielectric layer 14, but a method for the modulation of the refractive index of the waveguiding layers 15A and 15B is also applicable. Because the radiation mode light in the grating coupler is split into the transparent substrate side and the air side, as shown in FIG. 15(d), by providing a reflecting layer 78 on the surface of the transparent substrate 100 and forming a dielectric layer 14 and a waveguiding layer 15A thereon, the amount of radiation light on the air side is greater than that in the case where the reflecting layer 78 is not provided since the radiation mode light on the transparent substrate 100 side is reflected on the reflecting layer 78, causing an increase in the amount of light that is incident on the reflecting surface of the optical disk. Although the light returning from the reflecting surface of the optical disk is also split into waveguided light and transparent substrate side radiation-mode light by the grating coupler 9, the radiation mode light on the transparent substrate side is reflected on the reflecting layer 78 and a part of it becomes waveguided light, and therefore the conversion efficiency of the returning light to the waveguided light is also increased. This phenomenon also occurs in the case of the grating coupler 8. Namely, a transparent dielectric layer of a low refractive index and a reflecting layer of metal or the like are formed in that order on the waveguiding layer 15B, whereby the light which transmits or radiates without becoming waveguided light is reflected toward the waveguiding layer 15B side and a part of eh reflected light is input-coupled, so that the amount of waveguided light can be increased. In a case that a braid grating is adopted as shown in FIG. 15(e), single-sided radiation mode light can be obtained and the input/output efficiency can be improved without using a reflecting layer.

Figure 16A:
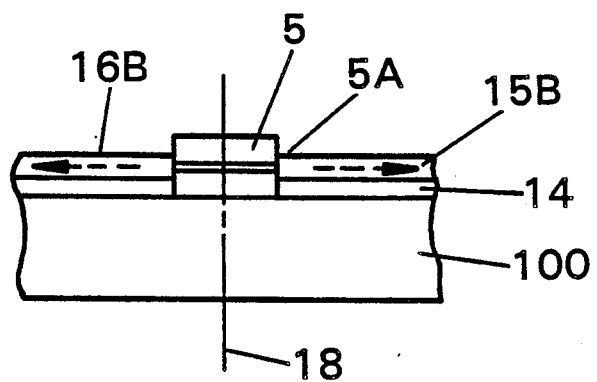
FIGS. 16(a)–16(c) and FIG. 17 are schematic diagrams showing other embodiments of this invention where laser light emitted by a semiconductor laser is directed into the waveguiding layer.
Figure 16B:
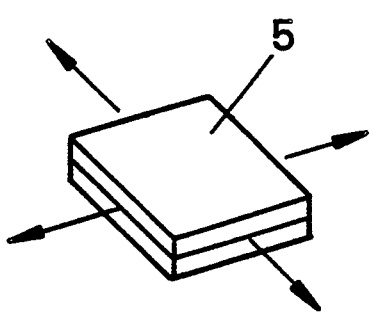
Figure 16C:
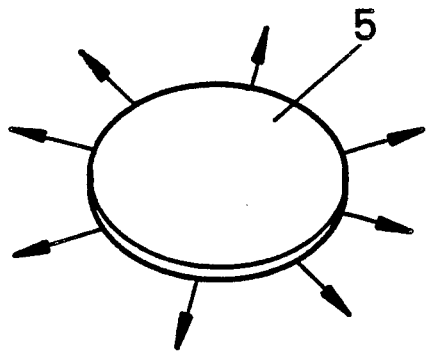

FIG. 16 shows another example of this invention where a laser light from a semiconductor laser is turned into waveguided light. In FIG. 16(a), a semiconductor laser 5 is formed in a waveguiding path where the laser light is emitted from the junction 5A spreads as it passes through the waveguiding layer 15B and becomes the waveguided light 16B of a TE mode. FIG. 16(b) shows an example of the radiation of laser beams in four directions, and FIG. 16(c) shows an example of the radiation thereof in every direction.

Figure 17:
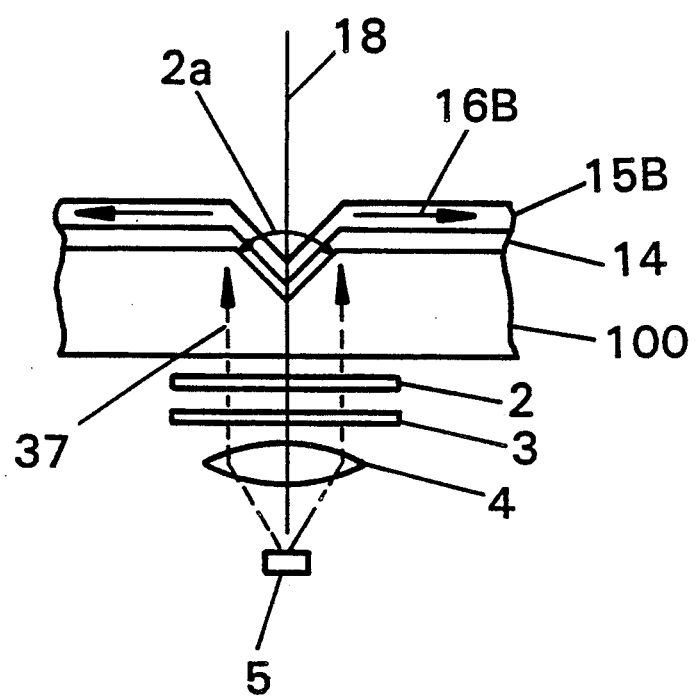

FIG. 17 shows another example of this invention where laser light emitted by a semiconductor laser is turned into waveguided light. A transparent substrate 100 (with a refractive index of $n_0$) has conical dents arranged around the center axis 18, on which a waveguiding layer 15B (with a refractive index of n) is formed in such a way that a transparent dielectric layer 14 (with a refractive index of $n_3$) is sandwiched therebetween. These refractive indexes are in a relation of $n_3 < n < n_0$, and the apex angle $2\alpha$ of the conical dent satisfies the following equation.

$$n_0 \cdot \sin \alpha = N \quad \text{------} \quad (7)$$

By designing a construction so that the thickness of the transparent dielectric layer 14 becomes small only in the conical region, this region is put into a waveguided light oscillating status, and concentrically polarized light 37 is input-coupled in the waveguiding layer 15B to turn it into the waveguided light 16B of a TE mode or a TM mode.

Figure 18:
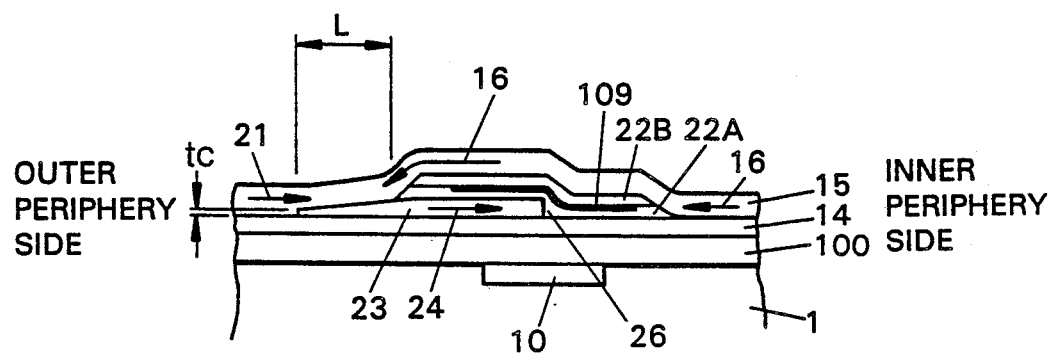
FIG. 18 is a schematic diagram showing another embodiment of this invention where a different process is adopted to split the waveguided light.

FIG. 18 is a cross sectional view showing another method for the separation of waveguided light. Only a single waveguiding layer is provided regardless of the inner or outer periphery, and the waveguided light 16 is transmitted through this single waveguiding layer 15. At the position of the light detector 10, a dielectric layer 23 with a refractive index higher than that of the waveguiding layer 15 and dielectric layers 22A and 22B with a low refractive index are disposed between the dielectric layer 14 and the waveguiding layer 15, these dielectric layers forming concentric ring-shaped areas around the axis 18. Although the dielectric laser 23 is separated from the waveguiding layer 15 by the dielectric layers 22A and 22B on the inner periphery side, it is in contact with the waveguiding layer 15 in the region L of the outer periphery side. The thickness of the dielectric layer 23 in this region L decreases toward the outer periphery because of a taper configuration thereof, becoming to at the foremost periphery. While the waveguided light 16 enters into the dielectric layer 23 with a high refractive index as it transmits through the region L, it returns to the waveguiding layer 15 again and passes through the region L because the thickness of the dielectric layer 23 decreases. Especially, when the value tc is smaller than the cut-off thickness of the waveguided light in the dielectric layer 23, energy loss at the time when the light passes through the region L is small.

On the other hand, the waveguided light 21 directed toward the inside of the waveguiding layer enters into the dielectric layer 23 with a high refractive index in the region L. Because the thickness of the dielectric layer 23 increases toward the transmission direction, the waveguided light deviates from the waveguiding layer 15 without returning to the waveguiding layer 15 any more, and becomes waveguided light 24. The extent of the branching of the waveguided light 21 into the waveguided light 24 can be adjusted by changing the length of the region L, and it is also possible to turn the entire waveguided light 21 into the waveguided light 24. The branched waveguided light 24 is radiated because the dielectric layer 23 is interrupted at the edge 26. The part of the radiated light which radiates toward the waveguiding layer 15 side is reflected on the reflecting layer 109 which is formed between the dielectric layers 22A and 22B, so that the bigger part of the radiated light is detected by the light detector 10. The reflecting layer 109 is not in direct contact with the waveguiding layer 15 and the dielectric layer 23, and consequently absorption of the waveguided lights 16 and 24 by the reflecting layer 109 is small.

Streak light (scattered light) of the waveguided light 16 is intercepted by the reflecting layer 109, and a contamination of noise into the light detector 10 can be prevented. As mentioned above, according to this invention, waveguided light is efficiently transmitted toward the outer periphery and radiated without being transmitted toward the inner periphery, so that both the transmission efficiency of light to the reflecting surface of the optical disk and the transmission efficiency thereof to the light detector can be improved at the same time, and the feedback of the waveguided light to the semiconductor laser 5 does not take place.

Figure 19:
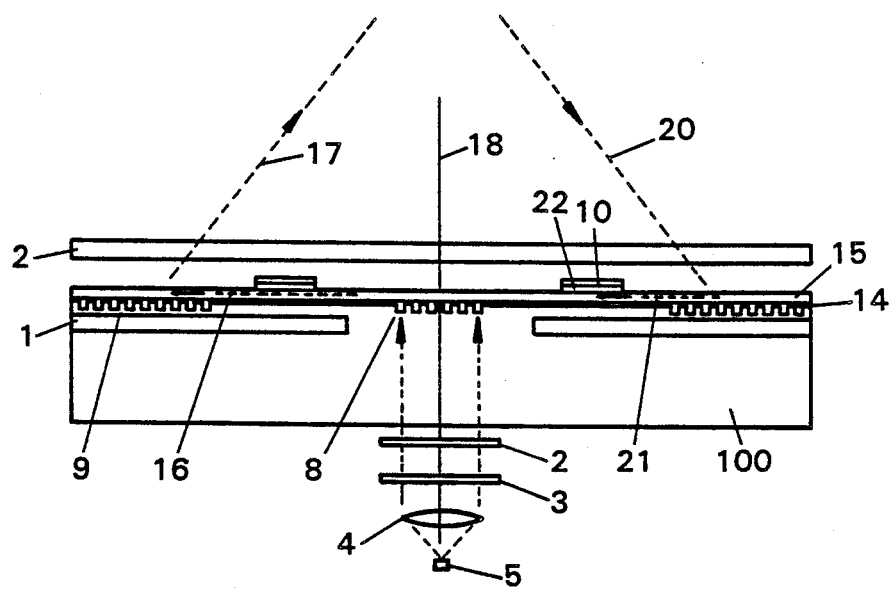
FIG. 19 is a schematic diagram showing another optical head apparatus of this invention.

FIG. 19 is a schematic diagram showing another optical head apparatus of this invention. Only a single waveguiding layer is provided regardless of the inner or outer periphery, and the waveguided light 16 of a TE mode is transmitted through this single waveguiding layer 15. The waveguided light 16 is turned into radiated light 17 (concentrically polarized light) by the grating coupler 9, and passes through the polarizer 2. As explained in FIG. 11, radiated light which has passed the polarize 2 again, becomes a circularly polarized light, and reflected light 20 reflected on the optical disk passes though the polarizer 2 again resulting in polarization in the direction of radiation. Accordingly, waveguided light which is input-coupled by the grating coupler 9 becomes light of a TM mode. On the waveguiding layer 15 is formed the ring-shaped light detector 10 concentrically with the grating coupler 9 and facing the inner periphery of the grating coupler while sandwiching the dielectric layer 22 of a refractive index lower than that of the waveguiding layer 15 therebetween. Because the evanescent wave of a waveguided light of a TM mode leaks more to the outside of the waveguiding layer than the waveguided light of a TE mode, it is more likely to be absorbed and, although the waveguided light 16 of a TE mode is transmitted, the waveguided light 21 of a TM mode is absorbed and detected by the light detector 10. In general the equivalent refractive index of the waveguided light of a TE mode is slightly greater than that of waveguided light of a TM mode. Consequently, the diffraction angle of radiation mode light is different between the waveguided light of a TE mode and that of a TM mode as shown in equation (2). And the input coupling efficiency of the reflected light 20 which has returned at the diffraction angle of the TE mode waveguided light to be converted to the waveguided light 21 of a TM mode decreases. The difference in the equivalent refractive index decreases with an increase in the thickness of the waveguiding layer. When the waveguiding layer thickness is increased to an appropriate value, the equivalent refractive index of the waveguided light of a TM mode can be made nearly equal to the equivalent refractive index of the waveguided light of a TE mode, with an insignificant decrease of the input coupling efficiency to the waveguided light of a TM mode. Therefore, the separation of the waveguided light can be done with a simple construction, a large amount of light can be detected by the light detector, and high quality control signals and reproduced signals can be obtained.

In the examples of this invention, although multiple light focusing points were obtained by dividing the grating coupler 9 by division lines in the radial direction into several parts, division can be done also in the tangential direction or a combination thereof. When divided in the tangential direction, a grating is formed on multiple ring-shaped regions around the axis 18, and each ring-shaped region is separated from the adjacent ring-shaped region by a ring-shaped space therebetween without overlapping. The light detector is formed to face the inner periphery of each ring-shaped grating (i.e., in the ring-shaped space region).

ADVANTAGES OF THE INVENTION

As explained above, the optical head apparatus of this invention has high focusing characteristics at the focal point and the focusing characteristics do not deteriorate even though the entire waveguided light is radiated, because the intensity distribution of the emitted light is of a configuration of concentric rings around the center axis. Therefore, both the focusing characteristics and the output coupling efficiency of the grating coupler can be improved at the same time, and both the focusing characteristics and the input coupling efficiency for the returning light can be improved at the same time. Also because the intensity distribution of the returning light is homomorphic with the intensity distribution of the emitted light at the returning position, the input coupling efficiency for the returning light can be made high. Also because the longitudinal aberration exhibits the maximum value at the position of the ring-shaped aperture, the deterioration of the focusing characteristics due to error factors such as a variation in the wavelength and a variation in the equivalent refractive index is small, so that the deterioration in the reproduction (or recording) performance is small. Also because the focusing error signal is detected by using the difference in the input coupling efficiency of the returning light, there is no fear that a defocus due to a variation in the wavelength and a variation in the equivalent refractive index, etc., occurs. Also because the waveguided light is separated by using the difference in the refractive index of the waveguiding layer, both the transmission efficiency of light to the reflecting surface of the optical disk and the transmission efficiency of light to the light detector can be improved at the same time at a high level. Moreover, because the waveguided light is transmitted from the center in every direction along the waveguiding path, a sufficient aperture area can be obtained and the apparatus can be made compact. Moreover, the grating, being of a concentric circle or spiral, can be easily machined.

We claim:

1. An optical head apparatus comprising a laser light source, a coupling means which introduces laser light from said laser light source into a waveguiding layer to turn it into waveguided light, a waveguiding path to direct the waveguided light from a point 0 in the waveguiding layer in the radiation direction, and a periodical structure A of concentric circles or a spiral configuration provided in the waveguiding path around the point 0, wherein said waveguided light is radiated by means of said periodical structure and is focused at a point F located outside of said waveguiding path.

2. An optical head apparatus of claim 1, wherein one or plural ring-shaped areas (or shapes which include rings) positioned around the central point 0 are divided into a certain number of areas, which have different periodical structures of concentric circles or spirals that are formed within said waveguiding path around the point 0, thereby providing a plurality of focal points corresponding to the light from said different periodical structures.

3. An optical head apparatus of claim 2, wherein at least one of the ring-shaped areas (or shapes which include rings) is divided into equal parts of an even number, opposing areas thereof being of the same periodic structure and adjacent areas thereof being of different structures.

4. An optical head apparatus of claim 2, wherein the light focusing points of light radiated from the periodical structure are separated by differentiating the thickness or the refractive index of the waveguiding layer on the ring-shaped areas (or shapes including rings) or the refractive index of a material which contacts the waveguiding layer.

5. An optical head apparatus of claim 1, wherein light reflected from a reflecting surface in the vicinity of the light focusing point of the light radiated from said periodical structure is returned to the periodical structure which is in an opposing position and is supplied to the waveguiding layer so as to be turned into waveguided light which transmits through the waveguiding layer toward the inner periphery thereof, and a detecting means for detecting said waveguided light which transmits toward said inner periphery is provided on the inner periphery side of said periodical structure.

6. An optical head apparatus of claim 5, wherein on said waveguiding layer (refractive index n) that is located between said periodical structure and said detecting means, a second transparent layer (refractive index $n_2$, $n<n_2$) is formed in such a manner as to sandwich a first transparent layer (refractive index $n_1$, $n_1<n$) therebetween, and said second transparent layer is in direct contact with said waveguiding layer at its outer periphery thereby to introduce the light, which is guided through said waveguiding layer toward the inner periphery, into said second transparent layer so that said waveguided light is detected by said detecting means.

7. An optical head apparatus of claim 5, where said waveguiding layer is composed of a first waveguiding layer (refractive index $n_A$) and a second waveguiding layer (refractive index $n_B$, $n_A<n_B$), and said first waveguiding layer and said second waveguiding layer overlap each other in a region between said periodical structure and said detecting means, said first waveguiding layer being formed extending from the overlapping section toward the outer periphery and said second waveguiding layer being formed toward the inner periphery, so that light which is guided through the waveguiding layer toward the outer periphery moves on from said second waveguiding layer to said first waveguiding layer, but light which is guided through the waveguiding the inner periphery radiates in the overlapping region of said first waveguiding layer, and the amount of radiated light is measured by said detecting means.

8. An optical head apparatus of claim 5, wherein focus error signals are obtained from a difference of signals which are detected by different detecting means which are provided on the inner periphery side of said different periodical structures.

9. An optical head apparatus of claim 5, wherein guide grooves or pits are formed on said reflecting surface, and tracking error signals are obtained from a difference of signals detected by different detecting means which are provided on the inner periphery side of the same periodical structure and which are located symmetrically with respect to a straight line which passes the central point 0 and is parallel to the guide grooves or pits.

10. An optical head apparatus of claim 1, wherein a periodical structure B in a configuration of concentric circles or spirals provided in said waveguiding path is formed around said point 0 and is used as a coupling means, by means of which laser light from a laser light source located outside of the waveguiding path is guided into the waveguiding layer.

11. An optical head apparatus of claim 1, wherein a waveguiding path is formed as a coupling means on a substrate with conical pits that are located around said central point 0, and laser light from a laser light source outside of said waveguiding path is guided into said waveguiding path by means of said coupling means.

12. An optical head apparatus of claim 11, wherein a waveguiding layer (refractive index n) is formed on said substrate (refractive index $n_0$) in such a manner to sandwich a third transparent layer (refractive index $n_3$) therebetween, and the thickness of said second transparent layer is reduced only at the parts above said pits and an inequality relation $n_3<n<n_0$ is satisfied.

13. An optical head apparatus of claim 10, wherein a quarter-wave plate is disposed between said laser light source and said coupling means, and laser light from said laser light source is turned into circularly polarized light by means of the quarter-wave plate and guided into said waveguiding path.

14. An optical head apparatus of claim 10, wherein a polarizing means which turns laser light from said laser light source into concentrically or radially polarized light is provided between said laser light source and said coupling means, and said polarized light is guided into said first transparent layer by means of the coupling means.

15. An optical head apparatus of claim 1, wherein a laser light source is provided at said central point 0 and said laser light source emits laser light in at least two directions or in every direction in the waveguiding path.

16. An optical head apparatus of claim 1, wherein a polarizing means is provided between said periodical structure and said light focusing point, said polarizing means turning light reflected from the reflecting means located in the vicinity of said light focusing point into radially or concentrically polarized light, the polarizing plane of which is rotated by 90 degrees from the light radiated from said periodical structure, and returning said polarized light to said periodical structure.

* * * * *